United States Patent [19]

Bartlow et al.

[11] B 3,925,132

[45] Dec. 9, 1975

[54] METHOD OF FORMING CIRCUMFERENTIALLY EXTENDING RIBS ON A ROTATING SHELL

[75] Inventors: David H. Bartlow, Huntingdon, Pa.; Bernard Howard Jones, Pendleton, S.C.; Lee E. Pearson, Granville, Ohio

[73] Assignee: Owens-Corning Fiberglas Corporation, Toledo, Ohio

[22] Filed: Sept. 13, 1972

[21] Appl. No.: 288,638

[44] Published under the Trial Voluntary Protest Program on January 28, 1975 as document no. B 288,638.

[52] U.S. Cl. ............... 156/161; 138/172; 156/172; 156/212; 220/3; 220/71; 428/36
[51] Int. Cl.² .................................... B32B 17/04
[58] Field of Search ........... 156/171, 173, 172, 161, 156/162, 212, 213; 161/152, DIG. 4; 220/72, 3, 71; 428/36; 138/172

[56] References Cited
UNITED STATES PATENTS

| | | | |
|---|---|---|---|
| 2,785,442 | 3/1957 | Boggs | 161/DIG. 4 |
| 3,083,864 | 2/1963 | Young | 161/DIG. 4 |
| 3,112,234 | 11/1963 | Krupp | 156/173 X |
| 3,134,704 | 5/1964 | Modigliani | 156/167 |
| 3,202,560 | 8/1965 | Michael | 156/289 X |
| 3,412,891 | 11/1968 | Bastone et al. | 156/171 X |
| 3,464,879 | 9/1969 | Poulsen | 156/425 |
| 3,700,512 | 10/1972 | Pearson et al. | 156/171 X |

*Primary Examiner*—Harold Ansher
*Assistant Examiner*—Henry F. Epstein
*Attorney, Agent, or Firm*—Carl G. Staelin; John W. Overman; William P. Hickey

[57] ABSTRACT

A method of forming ribs on a revolving shell in generally parallel circumferentially extending relationship. Each rib is built over a strip form having a cross section that is an isoceles trapezoid that is positioned with the base or wide parallel side against the shell, and the narrow parallel side forming the crown. A strip of glass fiber mat wetted with resin is carried by a band of individually tensioned strands which are attached to the revolving shell, and are wrapped therearound by the revolving shell. The band of strands is divided into three groups, the center of which is positioned over the crown and the outside groups of which are positioned over the inclined surfaces of the strip form. As the revolving shell pulls the individually tensioned strands over the rib, the outside groups pull the mat strip against the inclined sides of the rib form, and thereafter slide down the inclined surfaces of the mat to smooth out wrinkles. Finally the outside groups come to rest over the portions of the shell on opposite sides of the rib form to anchor to mat firmly in engagement with the shell and in tight engagement with the rib form. The materials are preferably fed to the underside of the revolving shell so that the strands may also carry the mat and the rib form to the surface of the revolving shell.

8 Claims, 4 Drawing Figures

METHOD OF FORMING CIRCUMFERENTIALLY EXTENDING RIBS ON A ROTATING SHELL

BACKGROUND OF THE INVENTION

Glass fiber reinforced polyester tanks for underground gasoline or chemical storage have been produced heretofore with external stiffening ribs on a noncontinuous basis. The shells have been produced on mandrels, and in most instances the shells are cured and removed from the mandrel where the stiffening ribs are applied over the top of the cured shell. At least in one instance, however, the ribs have been formed before the fiber and resin shell forming materials have been cured, and this also was done on an individual tank basis. One such process is disclosed in the Bastone et al U.S. Pat. No. 3,412,891. More recently, a development has taken place wherein the mandrel on which the resin and fibers are formed comprises abutting coils of a continuous band which is continuously slid axially over a rotating squirrel cage. The resin and fibers are applied thereto and after cure the ribbon is peeled away from the inside of the shell and is fed back to the beginning end of the machine where it is again wound upon the squirrel cage. This produces a continually advancing mandrel surface on which the shells can be produced continuously. In this continuous process and all of the discontinuous processes with which we are familiar, the materials forming the ribs are applied either with rollers or are applied in an airstream of short chopped fibers and sprayed resin. In the method of the Bastone patent, a rib form was used under some of these materials and a continuous filament was wound back and forth over these materials including the rib form at such an angle as to avoid slipping which if it occurred in the Bastone process would loosen the reinforcement.

An object of the present invention is the provision of a new and improved method of applying rib forming materials to a shell using a mat over a rib form in such a manner that the mat is automatically smoothed down upon the surface of the rib form during the application of strand reinforcement.

Another object of the present invention is the provision of a new and improved method of producing ribs on shells which can be performed in a continuous manner to provide spaced apart circumferentially extending bands of mat and resin without rolling the mat in place.

Further objects and advantages of the invention will become apparent to those skilled in the art to which the invention relates from the following description of the preferred embodiments described with reference to the accompanying drawings forming a part of this specification.

DESCRIPTION OF THE PREFERRED EMBODIMENTS

Figure 1:
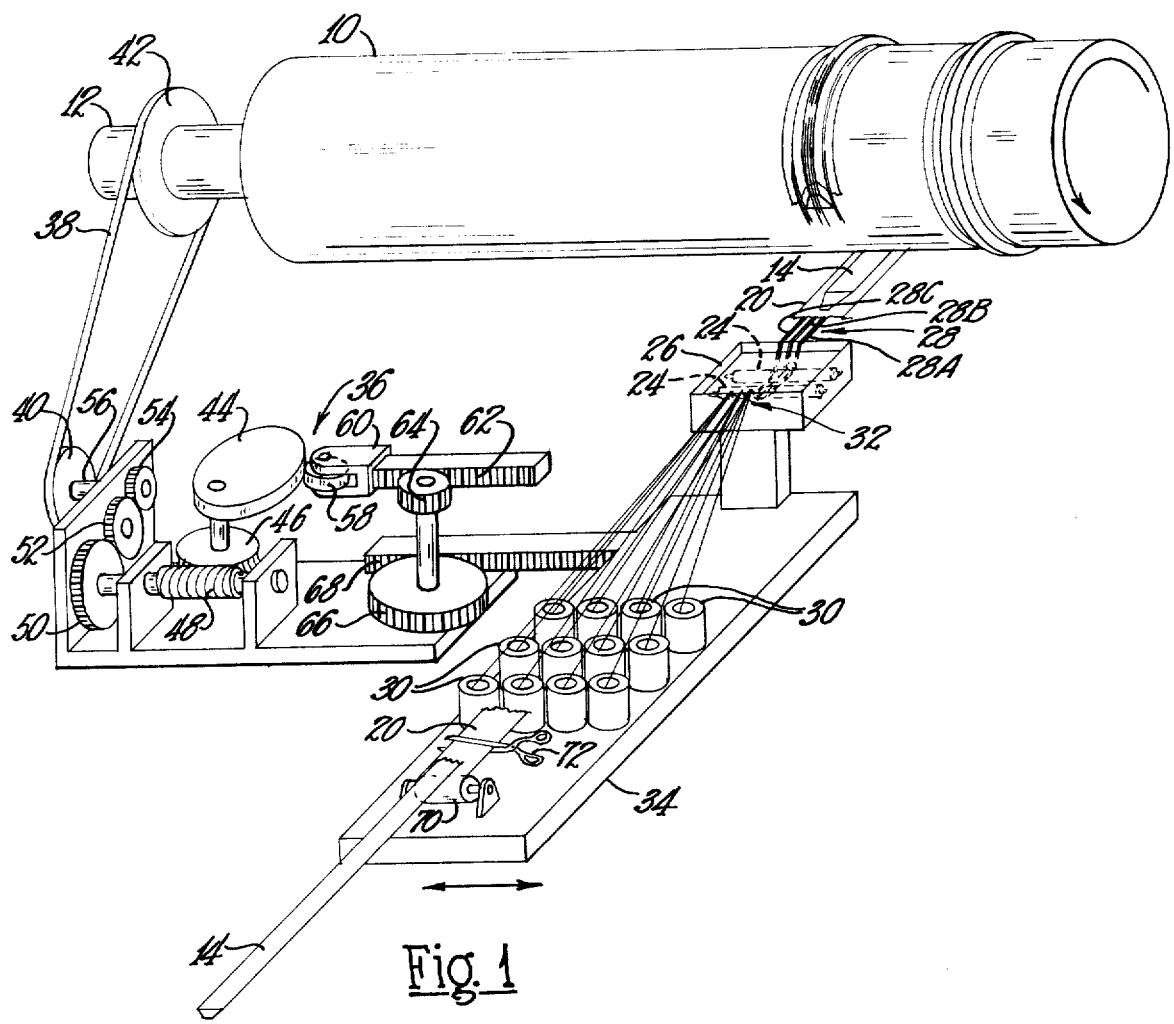
FIG. 1 is an isometric schematic view of apparatus for performing the method of the present invention.

The process of the present invention can be used to apply individual ribs on already produced shells, and particularly glass fiber reinforced plastic shells. In the preferred embodiment about to be described, however, the process of the present invention is used to produce ribs as part of a continuous process for the production of tubular shells. The materials which form the basic cylindrical shell are deposited on a continuously rotating mandrel, the surface of which also continuously moves axially part the material deposition station. The shell is cured and caused to move off of the mandrel where it is cut into lengths and moved to locations for installing end caps. The mandrel construction which makes this possible is sometimes called a continuous ribbon mandrel, and is described in the U.S. Poulsen Pat. No. 3,464,879. In FIG. 1 of the drawings, numeral 10 indicates the basic cylindrical shell forming material as deposited on the surface of the mandrel by apparatus not shown. The mandrel structure which is beneath the shell forming materials 10 is cantilevered from a large shaft 12 that is suitably journaled and supported by structure not shown.

The rib structure that is to be formed integrally with the shell before the shell forming materials are hardened, comprises a rib forming strip 14 which has a generally flat upper surface 16 and sloping sides 18. In the embodiment shown, the rib forming materail 14 has a cross section which is an isoceles trapezoid. The rib forming material 14 can be made of any suitable material since its primary purpose is to provide a form for supporting the plastic and glass fibers which are to be cured into a rib structure. The rib form 14 shown in the drawing is made from extruded 2 pound per cubic foot polyurethane closed cell foam having a length which corresponds to the circumference of the outer surface of the shell forming material 10. The leading edge of the strip is beveled at 45° for reasons which will later become apparent. The trailing edge of the strip is alos beveled at 45° but in the opposite direction, so that the two ends abut each other when wrapped around into a hoop. A mat strip 20 is applied over the top of the rib form 14. The mat has a width which exceeds the combined length of the upper surface 16 and sloping sides 18 of the rib form by an amount producing feet 22 which overlap the shell on opposite sides of the rib form. This overlap is preferably in the order of magnitude of 2 inches. The mat 20 is wetted out with resin as by rollers 24 that are located in a resin container 26.

It will be seen that mat strip 20 when shaped over the rib form 14 has portions at different diameters, and that the mat therefore must stretch or wrinkle to the extent that the fibers cannot stretch. In order that a large quantity of fibers can be put onto the mandrel during one revolution, the mat strip 20 shown in the drawing comprises a layer of chopped strand mat and a layer of woven roving sewn thereto. The woven roving is installed outwardly of the chopped strand mat. It will be seen that a problem exists in transporting the resin wetted mat to the mandrel and smoothing the mat over the rib form 14 and the shell forming materials.

Figure 2:
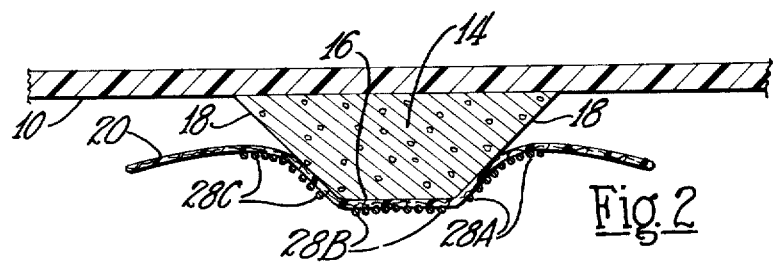
FIG. 2 is a fragmentary sectional view showing a rib form, mat and continuous strands being applied to a shell.
Figure 3:
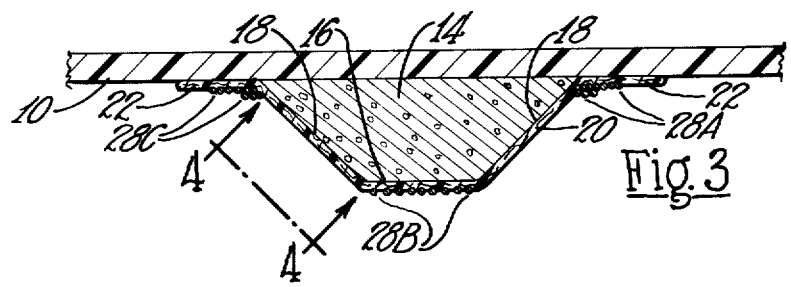
FIG. 3 is a fragmentary sectional view similar to FIG. 2, but showing the mat and strands in their final position before the application of a covering layer of resin.

According to the invention, the mat strip 20 is fed to the mandrel resting on top of a band 28 of continuous glass fiber strands. The band 28 of glass fiber strands is also passed around the rollers 24 to impregnate the strands with resin, but since the strands are continuous filaments the strands do not stretch. The band 28 of glass fibers is divided into three groups 28A, 28B, and 28C with the group 28B being fed so that it overlies the crown or flat upper surface 16 of the rib form 14, as best seen in FIGS. 2 and 3. The groups 28A and 28C overlie the sloping sides 18 of the rib form. All of the strands of the band 28 are removed from individual packages 30 and are pulled through a guiding and tensioning device 32, so that the individual strands of band 28 can move relative to each other. The strands of band 28 are wrapped onto the surface of the mandrel and pulled thereby against the tensioning device 32, so that the first portion of the mat which reaches the rib form is that carried by the group 28B, and this portion is forced against the crown 16 of the rib form. Thereafter, the groups 28A and 28C move out of the plane of the group 28B to force the surfaces of the mat against the sloping surfaces 18 of the rib form. The individual strands of the groups 28A and 28C are sufficiently tensioned that they thereafter slide down the inclined sufaces of the mat to smoothen the mat over the inclined surfacess 18 of the rib form 14. The individually tensioned strands of the groups 28A and 28C then come to rest against the shell forming materials 10 on opposite sides of the rib form 14. In these locations the individual strands are tensioned to hold the side edges of the mat in tight engagement with the shell forming materials 10. The band 28, therefore, not only convey the materials to the mandrel, but smooth out the materials over the rib form 14 and finally become a structural part of the reinforcing materials of the rib structure.

Figure 4:
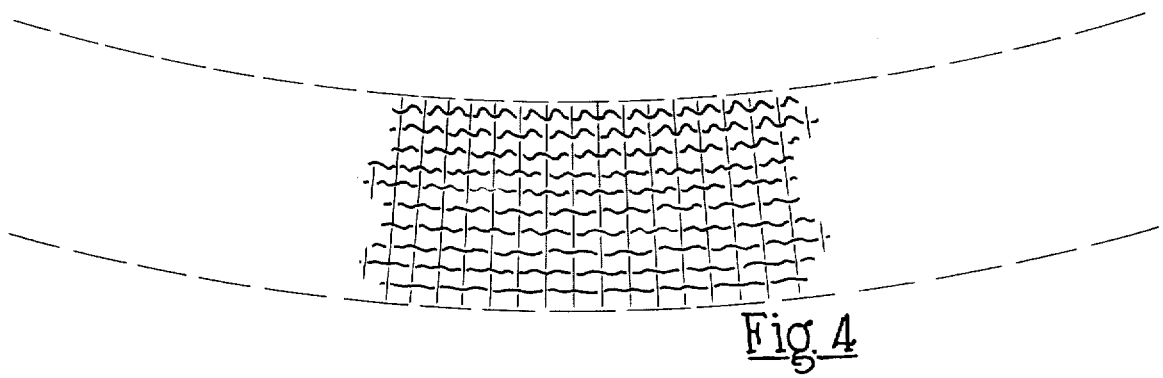
FIG. 4 is a fragmentary schematic view taken approximately on the line 4—4 of FIG. 3.

As the groups 28A and 28C slide down the inclined surfaces of the mat, they stretch the chopped strand mat to cause it to conform to the shape of the rib form 14, and simultaneously cause the woven roving to wrinkle slightly in the areas of the feet of the rib form structure. The action of the strands of band 28 is so uniform, however, thet the wrinkling is evenly distributed. The longitudinal strands of woven roving assume a horizontal wave pattern in many instances by reason of the lateral motion of the strands of band 28. Rolling in place by conventional rollers would not produce this horizontal wave pattern. It appears that the strands of the groups 28A and 28C force the circumferential strands of the woven roving into a zig zag configuration because of the manner in which they sequentially slide down the surface of the rib form and engage the top loops of the longitudinal strands of the woven roving and move them laterally. This action pulls the top loops of the strands laterally, and thereafter tacks them down in the looped condition as shown in FIG. 4. FIG. 2 shown an intermediate stage of the application of the mat to the rib form; and FIG. 3 shows the final configuration of the mat and continuous strands of band 28.

The feeding of the various materials to the mandrel can be performed by hand or by a hand operated carriage. As shown in the drawing, however, it is performed by a carriage 34 which is moved in synchronism with the longitudinal movement of the mandrel by means of a drive mechanism 36 that is driven by a chain 38, and sprockets 40 and 42 from the shaft 12 of the mandrel.

The drive mechanism 36 comprises a cam 44 driven by a spiral gear 46 that is meshed with a worm gear 48. The worm gear 48 is in turn driven from the sprocket 40, through meshing gears 50, 52, and 54. Gear 54 is fixed to the sprocket 40 by a connecting shaft 56. The cam 44 engaged by a roll type cam follower 58 that is journaled in a bifurcated attachment to a rack 62. The movement of rack 62 is amplified through gears 64 and 66 of different diameter, and the larger gear 66 is in engagement with a rack 68 that is affixed to the carriage 34. The arrangement is such that the carriage 34 is driven in synchronism with the longitudinal movement of the mandrel during the forming of a rib and is then indexed towards the starting end of the mandrel a distance corresponding to the spacing between the ribs where the filaments of band 28 are again tacked onto the mandrel and another rib formed. Instead of cutting the strands of band 28 after each rib is formed and before the carriage 34 is shifted to the locating of the following rib, the strands 28, could if desired, be left wrapped around the mandrel while the carriage is traversing the space between the ribs. Once the rib form engages the mandrel, however, the carriage 34 must be moved in synchronism with the mandrel, and the cam drive mechanism 36 is such that the carriage 34 is moved with the mandrel during the time that the form 14 and mat 20 are wound onto the shell. In the embodiment shown in the drawing, the form 14 is cut to length by hand prior to being delivered to the carriage 34 and the mat strip 20 is unrolled from the coiled package 70 and cut to length, as by the scissors 72. Alternatively, suitable mechanism can be provided on the carriage to cut the mat and rib form into proper lengths automatically.

It will now be seen that a new and improved method has been provided for feeding rib forming materials onto a revolving surface which not only transports the materials to the surface, but smoothens the rib forming materials in a unique manner onto the surface. Where the materials include longitudinally extending woven matting, the matting is buckled laterally so that the longitudinal fibers are deposited on a horizontal wave form in some instances, and in other instances where the woven material is wrinkled the wrinkles are so closely spaced and uniform as to be hardly detectable.

While the invention has been described in considerable detail, we do not wish to be limited to the particular embodiments shown and described, and it is out intention to cover hereby all novel adaptations, modifications, and arrangements thereof which come within the practice of those skilled in the art to which the invention relates.

We claim:

1. A method of installing glass fiber mat over the sloping surface of an envelope which extends around an axis of revolution, said sloping surface sloping inwardly obliquely toward said axis of revolution, said method comprising: causing said envelope to revolve about said axis of revolution, feeding a mat strip over said sloping surface of said envelope, feeding individual strands to said revolving sloping surface to become wound thereon, said strands being fed generally tangentially under tension over the external surface of said mat in a plane generally normal to said axis of revolution, and causing the tensioned strands to pull said mat down onto said sloping surface of said envelope and then slide obliquely sideways and inwardly toward said axis of revolution over said mat to automatically smooth said mat onto said obliquely sloping surface before said strands assume their final positions on said form.

2. The method of claim 1 wherein said mat is wetted with resin before being fed to said revolving surface.

3. The method of claim 1 wherein said sloping surface is a side of a rib form having a cross section that is an isosceles trapezoid.

4. The method of claim 1 wherein the mat has a width that is greater than the combined width of the outer surfaces of the rib form.

5. The method of claim 4 wherein said rib form, mat and strands are fed tangentially to the bottom of the revolving surface with the mat resting on the strands.

6. The method of claim 5 wherein said rib form has a cross section that is an isosceles trapezoid and said mat and strands are wetted with resin before engaging said revolving surface.

7. A method of producing a glass fiber reinforced plastic shell having an external stiffening rib thereon, comprising: rotating a generally horizontal cylindrical mandrel about its longitudinal axis, applying a coating of resin and glass fiber shell forming materials onto the surface of the mandrel, feeding a band of strands generally tangentially to the bottom of the cylindrical mandrel over the shell forming materials and causing the strands to be pulled thereon by the mandrel, feeding a mat of glass fibers to the mandrel on top of the strands, wetting the mat and strands with resin, feeding a form having a cross section that is an isosceles trapezoid having its short parallel side resting on the mat, said band of strands having portions directly beneath the sloping sides of the form, and tensioning the strands to cause strands on opposite sides of the top to bring the mat against the sloping sides of the form and thereafter slide down the sloping sides of the mat to smoothen the mat and with the strands coming to rest on the portions of the mat which engage the shell forming materials.

8. A method producing a glass fiber reinforced plastic rib on the revolving surface of a glass fiber reinforced plastic shell comprising: feeding a rib form strip having a generally flat base and sloping sides onto the revolving surface with the base adjacent the surface to cause the strip to wrap around the surface, concurrently feeding a mat strip over the outer surface of the rib form, and feeding individual strands to the revolving surface to become wound thereon, wetting the mat and strands with resin, said strands being fed generally tangentially under tension to the revolving surface at locations outwardly of the mat and sloping sides of the rib form, and causing the tensioned strands to pull the mat down onto the sloping sides of the rib form and then slide over the mat to come to rest on the revolving surface at the foot of the rib form, and whereby the mat is automatically smoothed onto the rib form.

* * * * *